April 17, 1934.  G. H. ALVEY  1,954,858
LAMINATED FLOOR COVERING
Filed April 8, 1932
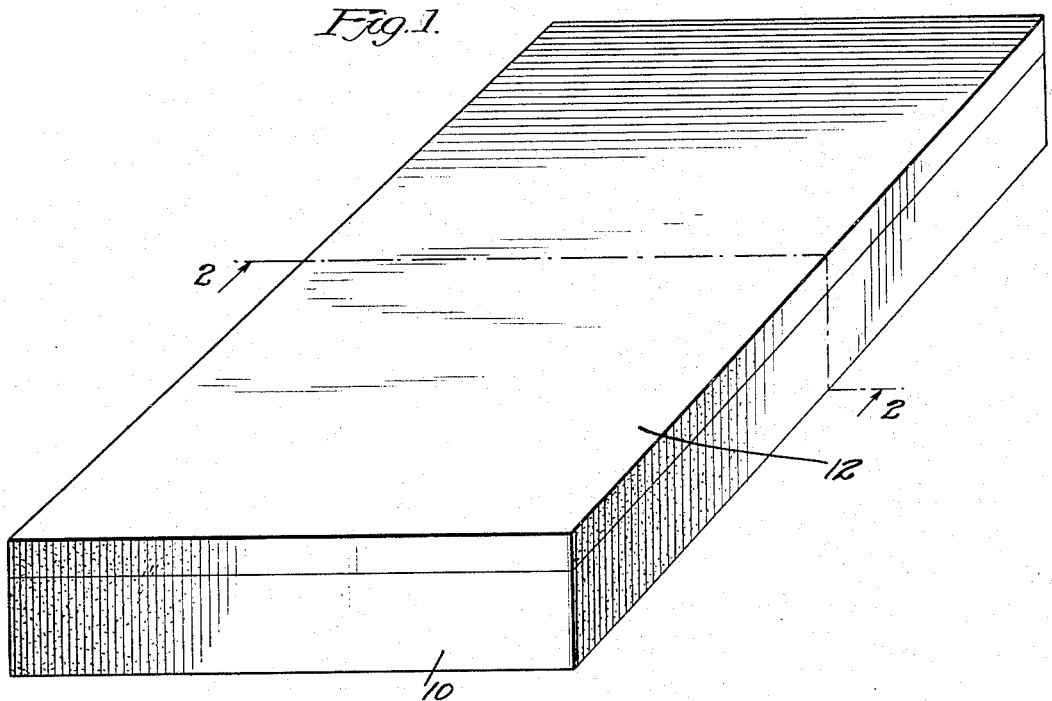
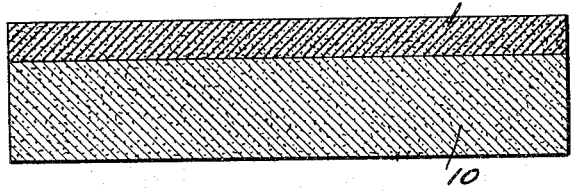
Inventor:
Glenn H. Alvey Patented Apr. 17, 1934

1,954,858

UNITED STATES PATENT OFFICE 1,954,858

LAMINATED FLOOR COVERING

Glenn H. Alvey, San Antonio, Tex., assignor to Uvalde Rock Asphalt Company, San Antonio, Tex., a corporation of Texas Application April 8, 1932, Serial No. 603,987

11 Claims. (Cl. 154—49)

The invention relates to molded floor coverings for those surfaces subjected to severe traffic and heavy standing loads and more particularly to molded asphalt plank, tile or similar products having flexibility and yet presenting a relatively hard wearing surface.

At the present time there is available asphalt plank and industrial tile which serve their purpose to a fair degree with the exception that all these products have the very objectionable feature of being relatively soft and thus easily displaced when subjected to heavy loads. The difficulties encountered in producing hard surfaced products able to withstand pressure without being materially displaced are that the materials required to produce the same are expensive and in most instances increasing surface hardness lessens the flexibility, with the result that such products crack too readily. The present invention aims to provide a molded asphalt plank, tile or like product suitable for floor coverings which will present a relatively hard surface while retaining a high degree of flexibility.

A more specific object resides in the provision of a floor covering fabricated in two or more layers, the lower having approximately the same consistency, toughness, hardness and flexibility as usual for asphalt plank or tile products, the upper layer, however, having relatively great hardness with less toughness and less flexibility.

The above can be varied to the extent of adding a color as one of the ingredients in the upper layer in order to secure a product having a colored surface. This addition of a coloring to the usual ingredients does not in any manner effect the properties of the material and so has the desired result of rendering the material equally adaptable to other uses where color must be considered.

With these and various other objects in view, the invention may consist of certain novel features, as will be more fully described and pointed out in the specification, drawing and claims appended hereto.

In the drawing which illustrates a laminated product formed of two layers and wherein like reference characters are used to designate like parts—

Figure 1 is a perspective view of a laminated block constructed in accordance with the invention and Figure 2 is a sectional view taken on line 2—2 of Figure 1.

In the selection of ingredients for manufacturing the present form of covering any thermoplastic binder either of the bituminous or hydrocarbon type may be used, with a base of any suitable naturally occurring or artificial mineral or other filler, strengthened by the addition of any type of fibrous material, organic or inorganic. Likewise the proportions will necessarily be variable and will be dependent solely upon the features or qualities desired in the finished product and upon the adequacy of manipulation in the process.

In manufacturing the laminated form of covering the layers are produced separately in sheet form and then rolled together while still hot. In order to describe one particular example, which, however, is not to be construed as a limitation of either materials or proportions the following is given:

The bottom course 10 may consist of an asphalt mastic composition containing approximately 5 to 10 per cent of cotton or other fiber, 25 to 35 per cent of medium hard asphalt having a penetration of from 10 to 30 at 77 degrees Fahr., the remaining consisting of 60 to 70 per cent of limestone, rock asphalt or other mineral filler which has been finely divided or pulverized so that not less than 75 per cent will pass an 80 mesh screen. For the top layer 12 of the laminated covering a composition is secured by intimately mixing 2 to 6 per cent of cotton or other fiber, 18 to 24 per cent of hard asphalt or other plastic binder having a penetration not exceeding 10 at 77 degrees Fahr., and 70 to 80 per cent of mineral filler which may include pulverized rock asphalt, limestone, silica or like substances. In those cases where asphaltic rock is used as the filler the percentage of pure asphalt added as a binder may be reduced by the amount of pure asphalt contained in the asphaltic rock. For the top layer the total bitumen should approximate 15 to 25 per cent.

For a colored surface the asphalt rock may be omitted entirely or in part and a white filler substituted in whole or in part, sufficient quantities of materials being added to give the desired colored effect. The invention contemplates that the proportions of the constituent ingredients may be varied to produce the various compounds mentioned. The ingredients for the upper and lower layers are compounded and intimately mixed in separate equipment such as any suitable mixer or masticator. When the mixtures have become plastic they are rolled out into sheets of the desired thickness by the use of calender rolls, the sheets being then superimposed one upon the other while still warm and passed through a second calender roll so as to combine them together in a laminated form. The calendering operation is then continued until a uniform sheet is obtained in which there is marked adhesion between the layers and no distinct line of cleavage is left. However, it may be found desirable when working with extremely dissimilar compositions to use a cementing medium in the form of a thin coat of bitumen or other adhesive between the layers.

Ordinarily the top layer will be much thinner than the underlying layer or layers but it may be equal to and in some cases even thicker than the top layer. It has been found that a satisfactory product can be made with the thickness of the upper layer being about one-fourth the total thickness of the laminated covering. In other words, if the product is of one inch thickness then the upper layer should be one-fourth inch thick or if the total thickness is only one-half inch then one-eighth inch is sufficient for the upper layer. Experience has proved that to reduce the thickness of the upper layer to less than one-sixteenth of an inch is not practicable as a heavy weight would tend to push through the hardened upper crust and in order to secure a satisfactory product when subjected to varying conditions it is necessary to maintain the thickness of the upper layer greater or at least equal to that stated.

By reason of the varying characteristics of the various layers forming the laminated covering a number of important and desirable results are secured, while the manufacturing cost for the product is held to a minimum. Objects stored upon a floor covered with the present material will not dent the same nearly as much as was the case with ordinary asphalt plank as the surface of the latter is relatively soft, whereas, in the present product a hardened upper surface is secured while the flexibility and toughness of the product as a whole is not materially reduced.

The foregoing description of the preferred manner of carrying out the invention is not to be considered as limiting but only by way of illustration as various changes may be resorted to by those skilled in the art without departing from the scope of the following claims.

I claim:

1. A laminated floor covering including a bottom course formed from a mastic composition containing fiber, an asphalt binder and a mineral filler, and a top course formed from a composition of like ingredients, said top course presenting a hard durable surface and said bottom course being tough and flexible.

2. A laminated floor covering including a bottom course formed from a mastic composition containing fiber, an asphalt binder and a mineral filler, and a top course formed from a composition containing fiber, a binder of hard asphalt and a mineral filler, whereby the top course although not as flexible as the lower course presents a harder more durable surface.

3. A laminated material for use as a floor covering and the like including a top layer of an asphaltic composition for presenting a hard durable wearing surface, and a bottom layer of an asphaltic composition, the bottom layer being tough and flexible.

4. In a laminated material, two layers of asphaltic composition, the top layer including as ingredients fiber, mineral filler and a hard asphalt binder, and the bottom layer including fiber, medium hard asphalt and pulverized asphalt rock.

5. In a laminated material, a bottom course composed of cotton, pulverized asphalt rock and medium hard asphalt, and a top course equal in thickness to substantially one-fourth of the total thickness of the material, said latter course being formed by compounding cotton, hard asphalt and pulverized asphalt rock.

6. In a laminated material, a bottom course composed of five to ten per cent fiber, twenty-five to thirty-five per cent of medium hard asphalt and the remainder pulverized asphalt rock, and a top course equal in thickness to substantially one-fourth of the total thickness of the material, said latter course being formed by compounding two to six per cent fiber, eighteen to twenty-four per cent hard asphalt and the remainder pulverized asphalt rock.

7. A multi-layer surface covering comprising a thermoplastic composition wherein various layers have differing characteristics, said layers including in varying proportions a thermoplastic binder, an organic fibrous material, and a major portion of pulverized bitumen-containing rock filler.

8. A multi-layer surface covering formed from a thermoplastic composition wherein various layers have differing characteristics, said layers including in varying proportions a thermoplastic binder, a major portion of pulverized bitumen-containing rock filler and not over 15 per cent of cotton fiber.

9. A multi-layer surface covering formed from a bituminous composition wherein the bottom layer has marked plasticity and softness and the top layer is relatively hard, said layers including in varying proportions a bituminous binder, a major portion of pulverized bitumen-containing rock filler and not over 15 per cent of cotton fiber.

10. A multi-layer surface covering formed from a bituminous composition wherein the bottom layer has marked plasticity and softness and the top layer is colored and is relatively hard, said layers including in varying proportions a bituminous binder, a major portion of pulverized bitumen-containing rock filler and not over 15 per cent of cotton fiber.

11. A multi-layer surface covering formed of layers of differing characteristics, the bottom layer comprising in admixture a binder, not over approximately 15 per cent cotton fiber and a filler, and the top layer including substantially the same ingredients with the addition of a coloring ingredient.

GLENN H. ALVEY.